United States Patent
Zhang

(10) Patent No.: US 12,039,340 B2
(45) Date of Patent: Jul. 16, 2024

(54) ELECTRONIC APPARATUS AND OPERATION METHOD THEREOF HAVING ELASTIC BOOT FILE ALLOCATION MECHANISM

(71) Applicant: REALTEK SEMICONDUCTOR CORPORATION, Hsinchu (TW)

(72) Inventor: Xing Zhang, Suzhou (CN)

(73) Assignee: REALTEK SEMICONDUCTOR CORPORATION, Hsinchu (TW)

( * ) Notice: Subject to any disclaimer, the term of this patent is extended or adjusted under 35 U.S.C. 154(b) by 30 days.

(21) Appl. No.: 17/845,253

(22) Filed: Jun. 21, 2022

(65) Prior Publication Data

US 2022/0413873 A1 Dec. 29, 2022

(30) Foreign Application Priority Data

Jun. 23, 2021 (CN) .......................... 202110699782.2

(51) Int. Cl.
*G06F 9/44* (2018.01)
*G06F 9/4401* (2018.01)

(52) U.S. Cl.
CPC .................................. *G06F 9/4403* (2013.01)

(58) Field of Classification Search
CPC .................................................... G06F 9/4403
See application file for complete search history.

(56) References Cited

U.S. PATENT DOCUMENTS

| 9,507,604 | B2 | 11/2016 | Huang |
| 2008/0288769 | A1* | 11/2008 | Shih ............... G06F 9/44505 713/100 |
| 2020/0073652 | A1 | 3/2020 | Chen |

FOREIGN PATENT DOCUMENTS

| TW | 201510866 A | 3/2015 |
| TW | 202009688 A | 3/2020 |

OTHER PUBLICATIONS

OA letter of a counterpart TW application (appl. no. 110124220) mailed on Apr. 18, 2022.

* cited by examiner

*Primary Examiner* — Stefan Stoynov
(74) *Attorney, Agent, or Firm* — WPAT, P.C

(57) ABSTRACT

The present invention discloses an electronic apparatus operation method having elastic boot file allocation mechanism that includes steps outlined below. A system activation procedure is executed by a processing circuit to load a hard code setting data from a boot code block of a boot data storage circuit to a system storage circuit. Version setting data is loaded to the system storage circuit to replace at least a part of the hard code setting data to generate boot setting data by the processing circuit when the version setting block is determined to include the version setting data by the processing circuit. The system activation procedure is proceeded to be executed according to the boot setting data by the processing circuit.

8 Claims, 2 Drawing Sheets

ELECTRONIC APPARATUS AND OPERATION METHOD THEREOF HAVING ELASTIC BOOT FILE ALLOCATION MECHANISM

BACKGROUND OF THE INVENTION

1. Field of the Invention

The present invention relates to an electronic apparatus and an electronic apparatus operation method thereof having elastic boot file allocation mechanism.

2. Description of Related Art

In a system activation procedure of an electronic apparatus, required boot data is loaded by the processing circuit to perform boot procedure. The boot data includes boot codes and boot parameters to be accessed by the processing circuit such that the whole system is activated accordingly.

In order to satisfy the packaging requirement or due to the protection of the software itself, the boot data is stored in a corresponding memory in a form of a hard code, in which the hard code is written in the memory and is not able to be modified or amended. However, the manufacturers of the apparatus have to dispose different versions of boot data for different countries or regions. When more countries and regions are presented, more different versions of boot data are needed. The cost of management of the versions of the boot data thus increases.

SUMMARY OF THE INVENTION

In consideration of the problem of the prior art, an object of the present invention is to supply an electronic apparatus and an electronic apparatus operation method thereof having elastic boot file allocation mechanism.

The present invention discloses an electronic apparatus having elastic boot file allocation mechanism that includes a boot data storage circuit, a system storage circuit and a processing circuit. The boot data storage circuit includes a boot code block and a version setting block. The processing circuit is configured to execute a system activation procedure to perform the steps outline below. Hard code setting data is loaded from the boot code block to the system storage circuit. Version setting data is loaded to the system storage circuit to replace at least a part of the hard code setting data to generate boot setting data when the version setting block is determined to include the version setting data. The system activation procedure is proceeded to be executed according to the boot setting data.

The present invention also discloses an electronic apparatus operation method thereof having elastic boot file allocation mechanism that includes the steps outlined below. A system activation procedure is executed by a processing circuit to load hard code setting data from a boot code block of a boot data storage circuit to the system storage circuit. Version setting data is loaded to the system storage circuit to replace at least a part of the hard code setting data to generate boot setting data when a version setting block of the boot data storage circuit is determined to comprise the version setting data by the processing circuit. The system activation procedure is proceeded to be executed according to the boot setting data by the processing circuit.

These and other objectives of the present invention will no doubt become obvious to those of ordinary skill in the art after reading the following detailed description of the preferred embodiments that are illustrated in the various figures and drawings.

DETAILED DESCRIPTION OF THE PREFERRED EMBODIMENTS

An aspect of the present invention is to provide an electronic apparatus and an electronic apparatus operation method thereof having elastic boot file allocation mechanism to replace at least part of hard code setting data by version setting data to generate the actual boot setting data used to proceed to execute a system activation procedure. Different versions of setting data are therefore easy to be managed.

Figure 1:
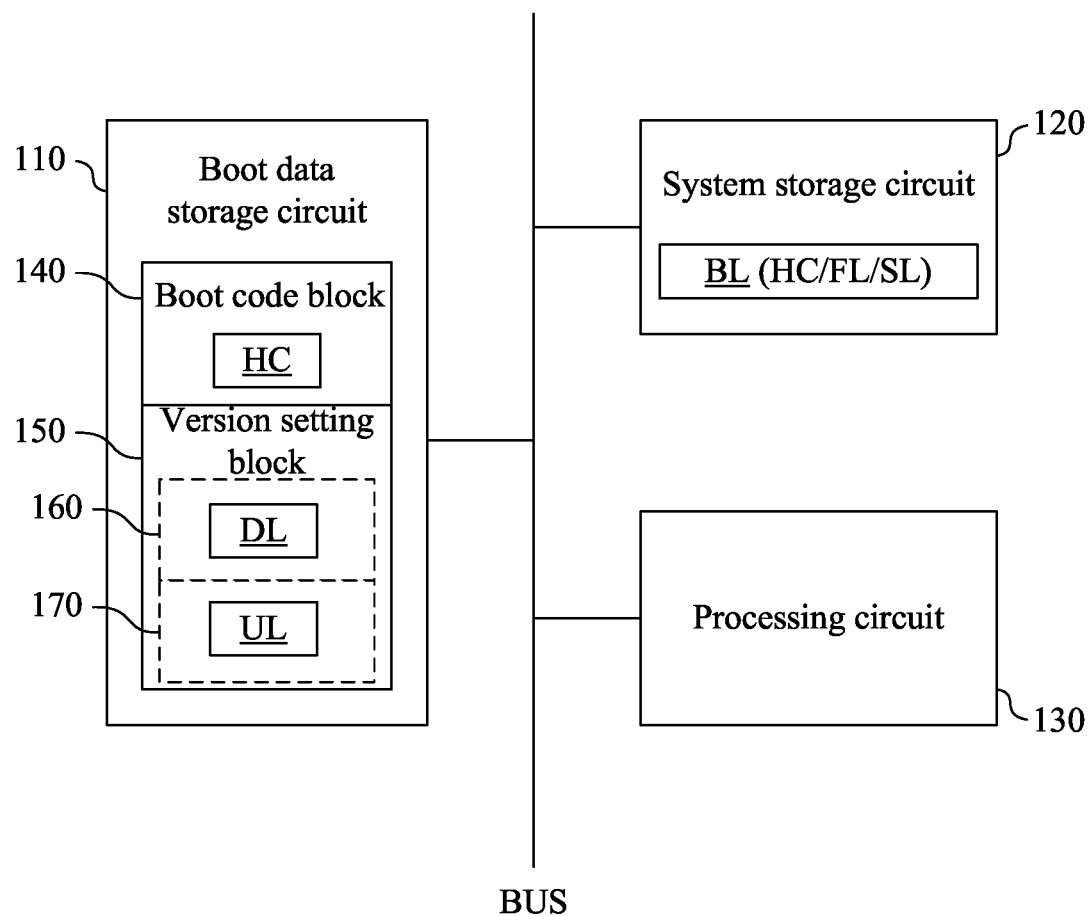
FIG. 1 illustrates a block diagram of an electronic apparatus having elastic boot file allocation mechanism according to an embodiment of the present invention.

Reference is now made to FIG. 1. FIG. 1 illustrates a block diagram of an electronic apparatus 100 having elastic boot file allocation mechanism according to an embodiment of the present invention. In an embodiment, the electronic apparatus 100 can be such as, but not limited to a router, a gateway or other types of electronic apparatuses. The present invention is not limited thereto. The electronic apparatus 100 includes a boot data storage circuit 110, a system storage circuit 120 and a processing circuit 130. The boot data storage circuit 110, the system storage circuit 120 and the processing circuit 130 can be connected to each other by using such as but not limited to system bus BUS to perform data access and transmission.

In an embodiment, the boot data storage circuit 110 is a flash memory and is configured to store data required when the electronic apparatus 100 is activated. The boot data storage circuit 110 includes a boot code block 140 and a version setting block 150.

The boot code block 140 is configured to store hard code setting data HC. The hard code setting data HC may include such as, but not limited to boot codes and boot parameters (not illustrated in the figure) and can be stored in different sub-blocks of the boot code block 140.

In an embodiment, the hard code setting data HC does not vary due to different manufacturers of the electronic apparatus 100 or the different user operations. In an embodiment, the hard code setting data HC is not able to be modified. More specifically, the hard code setting data HC in the boot code block 140 is not erased when a factory reset procedure is performed by the processing circuit 130 and cannot be modified by using other methods either.

The version setting block 150 is configured to store version setting data. In an embodiment, the version setting block 150 includes a default version setting sub-block 160 and a user version setting sub-block 170.

The default version setting sub-block 160 is configured to store default version setting data DL. Corresponding to different countries and regions of the manufacturers of the electronic apparatus 100, the default version setting data DL includes boot codes and/or boot parameters different from those of the hard code setting data HC.

For example, the default version setting data DL includes a wide area network (WAN) setting and a local area network (LAN) setting (e.g., a WAN connection number or a WiFi service set identifier (SSID) number), a device title, a firewall setting, a connection password setting or a combination thereof. It is appreciated that the data described above is merely an example. In other embodiments, the default version setting data DL may include other data.

In an embodiment, the default version setting data DL is the data that cannot be easily modified. More specifically, when the processing circuit 130 performs a factory reset procedure, the processing circuit 130 does not erase the default version setting data DL in the default version setting sub-block 160. However, in an embodiment, when the modification of the default version setting data DL is required to be made, burning, webpage uploading, trivial file transfer protocol (TFTP) uploading or remote server downloading can be used to modify the default version setting data DL.

The user version setting sub-block 170 is configured to store user version setting data UL. Corresponding to different user settings, the user version setting data UL includes boot codes and/or boot parameters different from those of the hard code setting data HC and/or default version setting data DL.

For example, the user version setting data UL includes a wide area network (WAN) setting and a local area network setting (e.g., a WAN connection number or a WiFi service set identifier number), a device title, a firewall setting, a connection password setting or a combination thereof. It is appreciated that the data described above is merely an example. In other embodiments, the user version setting data UL may include other data.

In an embodiment, the user version setting data UL is the data that can be modified. More specifically, when the processing circuit 130 performs a factory reset procedure, the processing circuit 130 erases the user version setting data UL in the user version setting sub-block 170. Besides, when the modification of the user version setting data UL is required to be made by using non-factory reset procedure, burning, webpage uploading, trivial file transfer protocol (TFTP) uploading or remote server downloading can be used to modify the user version setting data UL.

It is appreciated that the number of the sub-blocks and the data included in the sub-blocks in the version setting block 150 are merely an example. In other embodiments, the number of the sub-blocks in the version setting block 150 can be any number that is one or more than one. Further, each of the sub-blocks may include other data.

In an embodiment, the system storage circuit 120 is a random access memory and is configured to provide operation-related data that can be accessed by the processing circuit 130 during the operation of the electronic apparatus 100. In an embodiment, the processing circuit 130 loads the required data from the boot data storage circuit 110 to the system storage circuit 120 in a system activation procedure of the electronic apparatus 100, and proceeds to execute the system activation procedure according to the loaded boot setting data BL.

The system activation procedure is further described in detail in the following paragraphs.

When the processing circuit 130 executes the system activation procedure, the processing circuit 130 loads the hard code setting data HC from the boot code block 140 to the system storage circuit 120. Further, the processing circuit 130 determines whether the version setting block 150 includes the version setting data.

More specifically, the processing circuit 130 determines whether the default version setting sub-block 160 includes the default version setting data DL first and loads the default version setting data DL to the system storage circuit 120 to replace at least a part of the hard code setting data HC to generate first version setting data FL when the default version setting sub-block 160 includes the default version setting data DL.

For example, the default version setting data DL may include only the content of the wide area network setting and the local area network setting. The processing circuit 130 may replace the content of the wide area network setting and the local area network setting in the hard code setting data HC by the default version setting data DL. As a result, most of the content in the first version setting data FL is still the content of the hard code setting data HC, while only the content of the wide area network setting and the local area network setting are determined by the content of the default version setting data DL.

Further, the processing circuit 130 determines whether the user version setting sub-block 170 includes the user version setting data UL and loads the user version setting data UL to the system storage circuit 120 to replace at least a part of the first version setting data FL to generate second version setting data SL when the user version setting sub-block 170 includes the user version setting data UL.

For example, the user version setting data UL may include only the content of the device title and the connection password setting. The processing circuit 130 may replace the content of the device title and the connection password setting in the first version setting data FL by the user version setting data UL. As a result, most of the content in the second version setting data SL is still the content of the first version setting data FL, while only the device title and the connection password setting are determined by the content of the user version setting data UL.

As a result, according to whether the default version setting sub-block 160 and the user version setting sub-block 170 include the corresponding version setting data, the processing circuit 130 may generate the boot setting data BL having different contents and proceed to execute the system activation procedure according to the loaded boot setting data BL.

More specifically, when the default version setting sub-block 160 includes the default version setting data and the user version setting sub-block 170 does not include the user version setting data 170, the processing circuit 130 uses the first version setting data FL as the boot setting data BL.

When the default version setting sub-block 160 includes the default version setting data and the user version setting sub-block 170 includes the user version setting data 170, the processing circuit 130 uses the second version setting data SL as the boot setting data BL.

When the default version setting sub-block 160 does not include the default version setting data and the user version setting sub-block 170 does not include the user version setting data 170, the processing circuit 130 uses the hard code setting data HC as the boot setting data BL.

Based on the above description, the electronic apparatus of the present invention can replace at least a part of the hard code setting data by different version setting data to generate the actual boot setting data BL in the system activation procedure to proceed to the execute system activation procedure. As a result, only the version setting data having different boot codes or boot parameters are required to be disposed in the electronic apparatus. The different versions of whole hard code setting data corresponding to different countries or regions are not required. The version of the setting data is thus easy to be managed.

Figure 2:
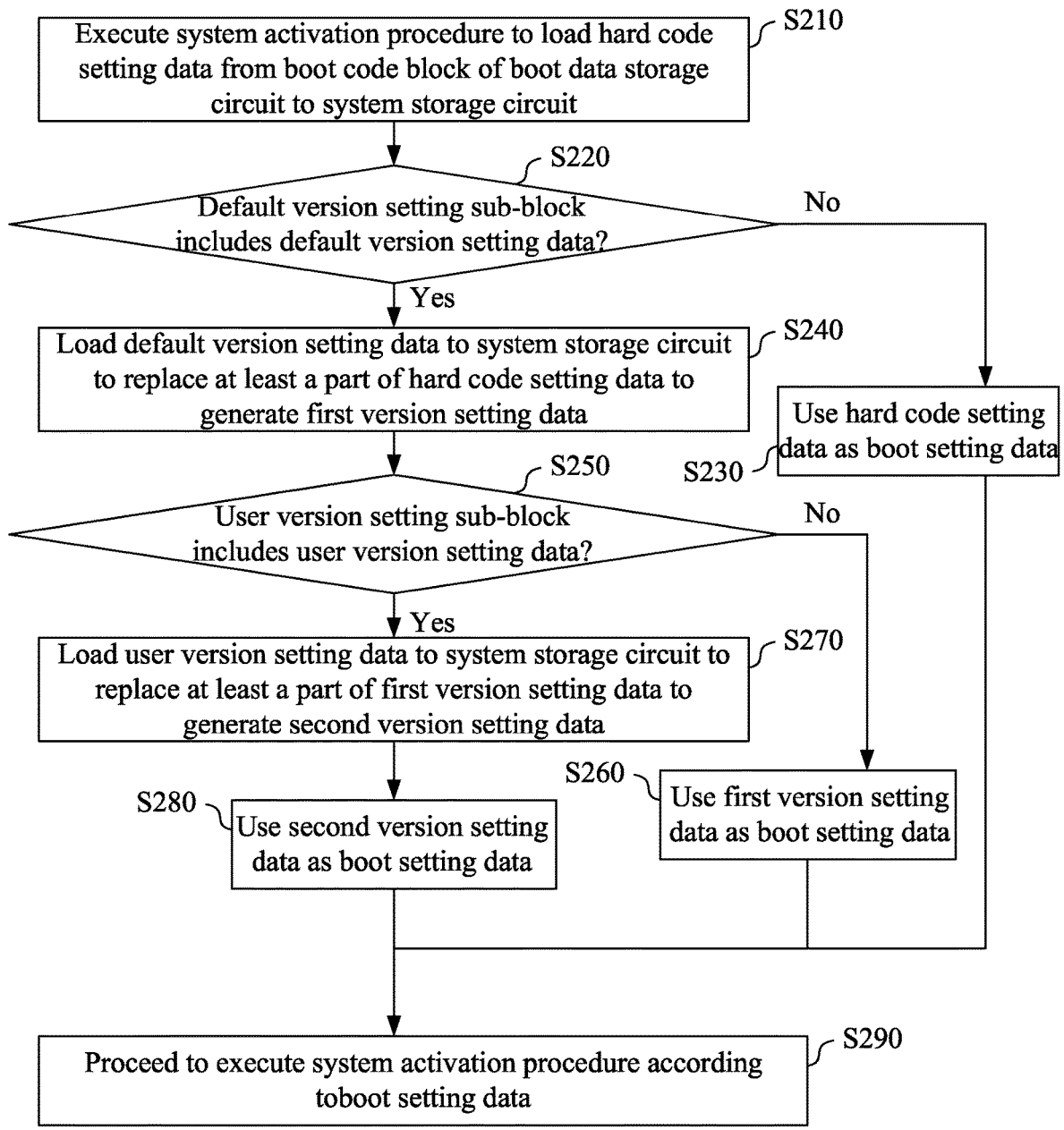
FIG. 2 illustrates a flow chart of an electronic apparatus operation method having elastic boot file allocation mechanism according to an embodiment of the present invention.

Reference is now made to FIG. 2. FIG. 2 illustrates a flow chart of an electronic apparatus operation method 200 having elastic boot file allocation mechanism according to an embodiment of the present invention.

In addition to the apparatus described above, the present disclosure further provides the electronic apparatus operation method 200 that can be used in such as, but not limited to, the electronic apparatus 100 in FIG. 1. As illustrated in FIG. 2, an embodiment of the electronic apparatus operation method 200 includes the following steps.

In step S210, the system activation procedure is executed by the processing circuit 130 to load the hard code setting data HC from the boot code block 140 of the boot data storage circuit 110 to the system storage circuit 120.

In step S220, whether the default version setting sub-block 160 included in version setting block 150 includes the default version setting data DL is determined by the processing circuit 130.

In step S230, the hard code setting data HC is used as the boot setting data BL when the default version setting sub-block 160 is determined to not include the default version setting data DL by the processing circuit 130.

In step S240, the default version setting data DL is loaded to the system storage circuit 120 to replace at least a part of the hard code setting data HC to generate the first version setting data FL when the default version setting sub-block 160 is determined to include the default version setting data DL by the processing circuit 130.

In step S250, whether the user version setting sub-block 170 included in version setting block 150 includes the user version setting data UL is determined by the processing circuit 130.

In step S260, the first version setting data FL is used as the boot setting data BL when the user version setting sub-block 170 is determined to not include the user version setting sub-block 170 by the processing circuit 130.

In step S270, the user version setting data UL is loaded to the system storage circuit 120 to replace at least a part of the first version setting data FL to generate the second version setting data SL when the user version setting sub-block 170 is determined to include the user version setting data UL by the processing circuit 130.

In step S280, the second version setting data SL is used as the boot setting data BL by the processing circuit 130.

In step S290, the system activation procedure is proceeded to be executed according to the boot setting data BL by the processing circuit 130 after step S230, step S260 and step 280.

It is appreciated that the embodiments described above are merely an example. In other embodiments, it should be appreciated that many modifications and changes may be made by those of ordinary skill in the art without departing, from the spirit of the disclosure.

In summary, the electronic apparatus and the electronic apparatus operation method thereof having elastic boot file allocation mechanism can replace at least a part of the hard code setting data by different version setting data to generate the actual boot setting data BL in the system activation procedure to proceed to the execute the system activation procedure. As a result, only the version setting data having different boot codes or boot parameters are required to be disposed in the electronic apparatus. The different versions of whole hard code setting data corresponding to different countries or regions are not required. The version of the setting data is thus easy to be managed.

The aforementioned descriptions represent merely the preferred embodiments of the present invention, without any intention to limit the scope of the present invention thereto. Various equivalent changes, alterations, or modifications based on the claims of present invention are all consequently viewed as being embraced by the scope of the present invention.

What is claimed is:

1. An electronic apparatus having elastic boot file allocation mechanism, comprising:
    a boot data storage circuit comprising a boot code block and a version setting block, wherein the version setting block comprises a default version setting sub-block and a user version setting sub-block;
    a system storage circuit; and
    a processing circuit configured to execute a system activation procedure to perform the steps of:
        loading hard code setting data from the boot code block to the system storage circuit;
        loading default version setting data to the system storage circuit to replace at least a part of the hard code setting data to generate first version setting data when the default version setting sub-block is determined to comprise the default version setting data;
        loading user version setting data to the system storage circuit to replace at least a part of the first version setting data to generate second version setting data when the user version setting sub-block is determined to comprise the user version setting data;
        using the first version setting data as boot setting data when the default version setting sub-block comprises the default version setting data and the user version setting sub-block does not comprise the user version setting data;
        using the second version setting data as the boot setting data when the default version setting sub-block comprises the default version setting data and the user version setting sub-block comprises the user version setting data; and
        proceeding to execute the system activation procedure according to the boot setting data.

2. The electronic apparatus of claim 1, wherein when the default version setting sub-block is determined to not include the default version setting data and when the user version setting sub-block is determined to not include the user version setting data, the hard code setting data is used as the boot setting data to proceed to execute the system activation procedure by processing circuit.

3. The electronic apparatus of claim 1, wherein each of the default version setting data and the user version setting data comprises a wide area network (WAN) setting, a local area network (LAN) setting, a device title, a firewall setting, a connection password setting or a combination thereof.

4. The electronic apparatus of claim 1, wherein the processing circuit is configured to erase the user version setting sub-block only during a factory reset procedure.

5. An electronic apparatus operation method having elastic boot file allocation mechanism, comprising:
    executing a system activation procedure by a processing circuit to load hard code setting data from a boot code block of a boot data storage circuit to the system storage circuit;
    loading default version setting data to the system storage circuit to replace at least a part of the hard code setting data to generate first version setting data when a default version setting sub-block comprised by a version setting block of the boot data storage circuit is determined to comprise the default version setting data;

loading user version setting data to the system storage circuit to replace at least a part of the first version setting data to generate second version setting data when a user version setting sub-block comprised by the version setting block of the boot data storage circuit is determined to comprise the user version setting data;

using the first version setting data as boot setting data when the default version setting sub-block comprises the default version setting data and the user version setting sub-block does not comprise the user version setting data;

using the second version setting data as the boot setting data when the default version setting sub-block comprises the default version setting data and the user version setting sub-block comprises the user version setting data; and proceeding to execute the system activation procedure according to the boot setting data by the processing circuit.

6. The electronic apparatus operation method of claim 5, further comprising:

using the hard code setting data as the boot setting data to proceed to execute the system activation procedure when the default version setting sub-block is determined to not include the default version setting data and when the user version setting sub-block is determined to not include the user version setting data by the processing circuit.

7. The electronic apparatus operation method of claim 5, wherein each of the default version setting data and the user version setting data comprises a wide area network setting, a local area network setting, a device title, a firewall setting, a connection password setting or a combination thereof.

8. The electronic apparatus operation method of claim 5, further comprising:

erasing the user version setting sub-block only during a factory reset procedure by the processing circuit.

* * * * *